(12) United States Patent
Agiwal et al.

(10) Patent No.: US 11,382,010 B2
(45) Date of Patent: Jul. 5, 2022

(54) METHOD AND APPARATUS OF MASTER INFORMATION BLOCK (MIB) ACQUISITION UPON HANDOVER

(71) Applicant: Samsung Electronics Co., Ltd., Suwon-si (KR)

(72) Inventors: Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 16/667,169

(22) Filed: Oct. 29, 2019

(65) Prior Publication Data
US 2020/0137645 A1 Apr. 30, 2020

Related U.S. Application Data

(60) Provisional application No. 62/752,520, filed on Oct. 30, 2018.

(51) Int. Cl.
*H04W 36/00* (2009.01)
*H04L 5/00* (2006.01)
*H04L 5/14* (2006.01)

(52) U.S. Cl.
CPC ....... *H04W 36/0069* (2018.08); *H04L 5/0035* (2013.01); *H04L 5/0051* (2013.01);
(Continued)

(58) Field of Classification Search
CPC ......... H04W 36/0069; H04W 36/0007; H04W 36/0061; H04W 36/0072; H04L 5/0035; H04L 5/0051; H04L 5/1438
See application file for complete search history.

(56) References Cited

U.S. PATENT DOCUMENTS

2012/0177006 A1 7/2012 Tsai et al.
2018/0110075 A1 4/2018 Ly et al.
(Continued)

FOREIGN PATENT DOCUMENTS

IN 201811011728 A1 10/2019

OTHER PUBLICATIONS

International Search Report dated Feb. 6, 2020, issued in an International Application No. PCT/KR2019/014399.
(Continued)

*Primary Examiner* — Eric Myers
(74) *Attorney, Agent, or Firm* — Jefferson IP Law, LLP

(57) ABSTRACT

A communication method and a system for converging a fifth generation (5G) communication system for supporting higher data rates beyond a fourth generation (4G) system with a technology for Internet of things (IoT) are provided. The communication method and system include intelligent services based on the 5G communication technology and the IoT-related technology. A method by a terminal for performing a random access procedure upon handover in a wireless communication system is provided. The method comprises identifying at least one of whether timing of a target cell is available or whether a physical random access channel (PRACH) association period is greater than one radio frame, determining whether to initiate a random access procedure on the target cell before receiving and decoding a physical broadcast channel (PBCH) of the target cell based on the identification, and performing the random access procedure based on the determination.

18 Claims, 5 Drawing Sheets

(52) U.S. Cl.
CPC ....... *H04L 5/1438* (2013.01); *H04W 36/0007* (2018.08); *H04W 36/0061* (2013.01); *H04W 36/0072* (2013.01)

(56) References Cited

U.S. PATENT DOCUMENTS

2019/0230696 A1* 7/2019 Kim .................. H04W 72/1278
2019/0306827 A1   10/2019 Agiwal et al.

OTHER PUBLICATIONS

LG Electronics, 'Maintenance for Downlink signals and channels', R1-1810248, 3GPP TSG RAN WG1 Meeting #94bis, Sep. 29, 2018. See pp. 3, 5-6; and table 1.

5G; NR; Radio Resource Conliul (RRC); Protocol specification (3GPP TS 38.331 version 15.3.0 Release 15), ETSI TS 138 331 V15.3.0, Oct. 16, 2018. See pp. 40-42.

Ericsson, 'Draft LS on network synchronization for handover purposes', R1-1812027, 3GPP TSG-RAN1 Meeting #94bis, Oct. 12, 2018.

* cited by examiner

METHOD AND APPARATUS OF MASTER INFORMATION BLOCK (MIB) ACQUISITION UPON HANDOVER

CROSS-REFERENCE TO RELATED APPLICATION(S)

This application is based on and claims priority under 35 U.S.C. § 119 (e) of a U.S. Provisional application Ser. No. 62/752,520, filed on Oct. 30, 2018, in the U.S. Patent and Trademark Office, the disclosure of which is incorporated by reference herein in its entirety.

BACKGROUND

1. Field

The disclosure relates to a system and a method of master information block (MIB) acquisition upon handover.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands, but also in higher frequency (mmWave) bands, e.g., 10 GHz to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large scale antenna techniques are being considered in the design of the 5G wireless communication system. In addition, in 5G communication systems, development for system network improvement is under-way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving to the internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth have been recently researched. Such an IoT environment may provide intelligent Internet technology services that create a new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In recent years several broadband wireless technologies have been developed to meet the growing number of broadband subscribers and to provide more and better applications and services such as these. The second generation (2G) wireless communication system has been developed to provide voice services while ensuring the mobility of users. Third generation (3G) wireless communication system supports not only the voice service, but also data service. The 4G wireless communication system has been developed to provide high-speed data service. However, the 4G wireless communication system currently suffers from lack of resources to meet the growing demand for high-speed data services. Therefore, the 5G wireless communication system is being developed to meet the growing demand of various services with diverse requirements, e.g., high-speed data services, support ultra-reliability and low latency applications.

In addition, the 5G wireless communication system is expected to address different use cases having quite different requirements in terms of data rate, latency, reliability, mobility etc. However, it is expected that the design of the air-interface of the 5G wireless communication system would be flexible enough to serve user equipments (UEs) having quite different capabilities depending on the use case and market segment in which the UE caters service to the end customer. Example use cases the 5G wireless communication system is expected to address includes enhanced mobile broadband (eMBB), massive Machine Type Communication (m-MTC), ultra-reliable low latency communication (URLL), etc. The eMBB requirements like tens of Gbps data rate, low latency, high mobility so on, address the market segment representing the wireless broadband subscribers of the related art needing internet connectivity everywhere, all the time and on the go. The m-MTC requirements like very high connection density, infrequent data transmission, very long battery life, low mobility address so on, address the market segment representing the IoT/IoE envisioning connectivity of billions of devices. The URLL requirements like very low latency, very high reliability and variable mobility so on and so forth address the market segment representing the Industrial automation application, vehicle-to-vehicle/vehicle-to-infrastructure communication that is foreseen as one of the enablers for autonomous cars.

In the 4G wireless communication system, an enhanced node B (eNB) or a base station in cell broadcasts system information (SI). SI is structured into master information block (MIB) and a set of SI blocks (SIBs). MIB consists of system frame number (SFN), downlink system bandwidth and physical hybrid automatic repeat request (ARQ) feedback indicator channel (PHICH) configuration. MIB is transmitted every 40 ms. It is repeated every 1 0ms wherein the first transmission occurs in subframe #0 when SFN mod 4 equals zero. MIB is transmitted on physical broadcast channel. System information block type 1 (SIB1) carries cell identity, tracking area code, cell barring information, value tag (common for all scheduling units), and scheduling information of other SIBs. SIB1 is transmitted every 80 ms in subframe #5 when SFN mod 8 equals zero. SIB1 is repeated in subframe #5 when SFN mod 2 equals zero. SIB1 is transmitted on physical downlink shared channel. Other SIBs (SIB2 to SIB19) are transmitted in SI message wherein scheduling info of these SIBs are indicated in SIB1.

UE acquires the SI at cell selection, cell reselection, after handover completion, after entering evolved universal mobile telecommunications system (UMTS) terrestrial radio access (E-UTRA) from another radio access technology (RAT), upon re-entering service area, upon receiving a notification (paging), and upon exceeding the maximum validity duration (3 hr). In radio resource control (RRC) idle and inactive state, UE needs to acquire MIB, SIB1, SIB2 to SIB5, SIB6 to SIB8 (depending on RAT supported), SIB17 (if LTE-wireless local area network (WLAN) interworking (IWK) is supported), and SIB18 to SIB19 (if D2D is supported). In RRC connected state, UE needs to acquire MIB, SIB1, SIB2, SIB8 (depending on RAT supported), SIB17 (if LTE-WLAN IWK is supported), and SIB18 to SIB19 (if D2D is supported).

In the 5G wireless communication system (also referred as next generation radio or NR), SI is divided into the MIB and a number of SIBs where:
  the MIB is always transmitted on the broadcast channel (BCH) with a periodicity of 80 ms and repetitions made within 80 ms and it includes parameters that are needed to acquire SIB1 from the cell.
  the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB.
  SIBs other than SIB1 are carried in SI messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

NR supports standalone mode of operation as well dual connectivity (DC). In DC, a multiple reception (Rx)/transmission (Tx) UE may be configured to utilize resources provided by two different nodes connected via non-ideal backhaul. One node acts as the master node (MN) and the other as the secondary node (SN). The MN and SN are connected via a network interface and at least the MN is connected to the core network. NR also supports multi-RAT dual connectivity (MR-DC) operation whereby a UE in RRC_CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB).

In NR, the term master cell group (MCG) refers to a group of serving cells associated with the MN, comprising of the primary cell (PCell) and optionally one or more secondary cells (SCells). In NR, the term secondary cell group (SCG) refers to a group of serving cells associated with the SN, comprising of the primary SCG cell (PSCell) and optionally one or more SCells. In NR, PCell refers to a serving cell in MCG, operating on the primary frequency, in which the UE either performs the initial connection establishment procedure or initiates the connection re-establishment procedure. PSCell refers to a serving cell in SCG in which the UE performs random access when performing the reconfiguration with sync procedure. For DC operation, the term SpCell (i.e. Special Cell) refers to the PCell of the MCG or the PSCell of the SCG, otherwise the term SpCell refers to the PCell.

In NR, reconfiguration procedure as specified in technical specification (TS) 38.331, is used to modify an RRC connection, e.g. to establish/modify/release radio bearers (RBs), to perform reconfiguration with sync, to setup/modify/release measurements, to add/modify/release SCells and cell groups. If the UE receives RRCReconfiguration message wherein CellGroupConfig IE in RRCReconfiguration message contains the spCellConfig with reconfigurationWithSync, UE performs reconfiguration with sync procedure. During this procedure, UE synchronizes to the downlink (DL) of the target SpCell and acquires the MIB of the target SpCell by receiving and decoding the physical broadcast channel (PBCH) of target SpCell. UE then initiates the random access towards the target SpCell. If the target SpCell is PCell, RRCConnectionReconfigurationComplete message is transmitted to target SpCell. Otherwise it is transmitted on source PCell.

The acquisition of MIB before initiating random access on target SpCell increases the delay in accessing the target SpCell. This would lead to increased data interruption during scenarios such has handover, SCG addition, etc.

Thus, an enhanced method of receiving and decoding PBCH and MIB is desired.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

The acquisition of master information block (MIB) before initiating random access on target special (SpCell) increases the delay in accessing the target SpCell. This would lead to increased data interruption during scenarios such has handover, secondary cell group (SCG) addition, etc. So an enhanced method of receiving and decoding physical broadcast channel (PBCH) and MIB is needed.

In accordance with an aspect of the disclosure, a method by a terminal for performing a random access procedure upon handover in a wireless communication system is provided. The method includes identifying at least one of whether timing of a target cell is available or whether a physical random access channel (PRACH) association period is greater than one radio frame, determining whether to initiate a random access procedure on the target cell before receiving and decoding a physical broadcast channel (PBCH) of the target cell based on the identification, and performing the random access procedure based on the determination.

In accordance with another aspect of the disclosure, a terminal in a wireless communication system is provided. The terminal includes a transceiver and a at least one processor coupled with the transceiver. The at least one processor is configured to identify at least one of whether timing of a target cell is available or whether a physical random access channel (PRACH) association period is greater than one radio frame, determine whether to initiate a random access procedure on the target cell before receiving and decoding a physical broadcast channel (PBCH) of the target cell based on the identification, and perform the random access procedure based on the determination.

The acquisition of MIB before initiating random access on target SpCell increases the delay in accessing the target SpCell. This would lead to increased data interruption during scenarios such has handover, SCG addition, etc. In the disclosure, in order to reduce this delay, the method is proposed wherein a terminal acquires MIB and/or PBCH before initiating random access on target SpCell only if certain criteria are met. Otherwise, the terminal does not acquire MIB and/or PBCH before initiating random access on target SpCell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
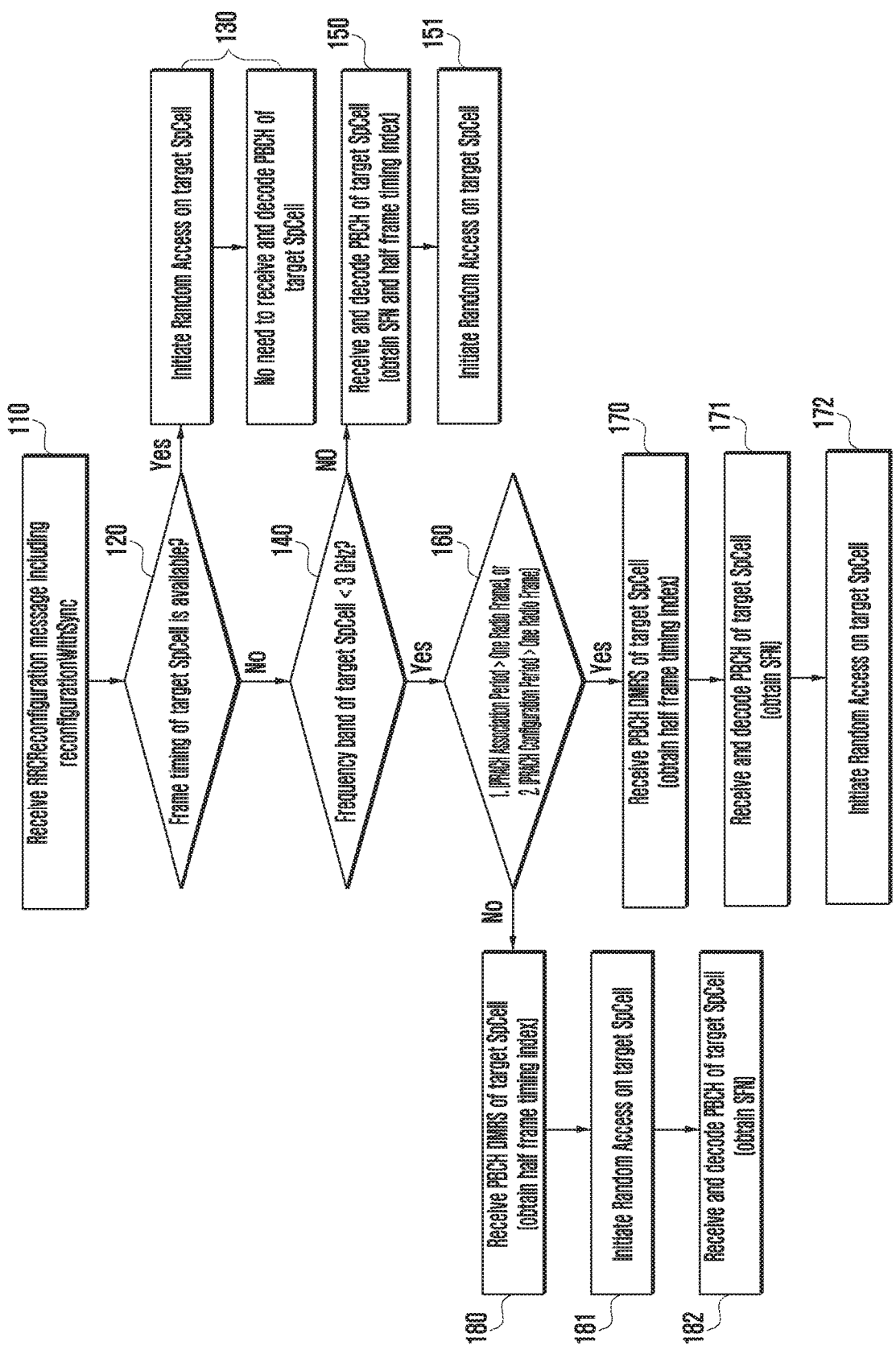
FIG. 1 shows an operation to acquire master information block (MIB) upon receiving RRCReconfiguration message including reconfigurationWithSync according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A "base station (BS)" is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A "UE" is an entity communicating with a BS and may be referred to as a UE, a device, a mobile station (MS), a mobile equipment (ME), or a terminal.

Embodiment 1

FIG. 1 shows an operation to acquire master information block (MIB) upon receiving RRCReconfiguration message including reconfigurationWithSync according to an embodiment of the disclosure.

1. Referring to FIG. 1, UE receives RRCReconfiguration message wherein CellGroupConfig IE in RRCReconfiguration message contains the spCellConfig with reconfigurationWithSync at operation 110; reconfigurationWithSync includes parameters for the synchronous reconfiguration to the target SpCell.

2. UE determines whether frame timing of target special cell (SpCell) is available or not at operation 120. Frame timing is considered available if UE knows the start of radio frame and SystemFrameNumber of radio frame in target SpCell. UE can determine the frame timing of target SpCell in one of the following ways:

A. If UE has received measurement configuration in the connected state wherein the parameter deriveSSB-IndexFromCell was set to TRUE in a measurement object corresponding to 'synchronization signal block (SSB) frequency (given by absolute radio frequency channel number (ARFCN)) and SSB subcarrier pacing of target SpCell' and if UE is configured with a serving cell whose SSB frequency and SSB subcarrier spacing is same as SSB frequency and SSB subcarrier Spacing of target SpCell then the frame timing of target SpCell is same as the frame timing of this serving cell.

B. If UE has received measurement configuration in the connected state wherein the parameter deriveSSB-IndexFromCell was set to TRUE in a measurement object corresponding to 'SSB frequency (given by ARFCN) and SSB subcarrier spacing of target SpCell' and UE has the frame timing of any neighbor cell detected on SSB frequency of target SpCell then the frame timing of target SpCell is same as the frame timing of this neighbor cell.

C. If UE has a valid stored system information wherein the parameter deriveSSB-IndexFromCell was set to TRUE corresponding to 'SSB frequency (given by ARFCN) and SSB subcarrier spacing of target SpCell' and if UE is configured with a serving cell whose SSB frequency and SSB subcarrier spacing is same as SSB frequency and SSB subcarrier spacing of target SpCell then the frame timing of target SpCell is same as the frame timing of this serving cell.

D. If UE has a valid stored system information wherein the parameter deriveSSB-IndexFromCell was set to TRUE corresponding to 'SSB frequency (given by ARFCN) and SSB subcarrier spacing of target SpCell' and UE has the frame timing of any neighbor cell detected on SSB frequency of target SpCell then the frame timing of target SpCell is same as the frame timing of this neighbor cell.

E. If the target SpCell's frequency band belongs to frequency range 2 (FR2) and UE has a serving cell whose frequency is same as the frequency of target SpCell, then the frame timing of target SpCell is same as the frame timing of this serving cell.

F. If the target SpCell's frequency band belongs to FR2 and UE has frame timing of any neighbor cell whose frequency is same as the frequency of target SpCell then the frame timing of target SpCell is same as the frame timing of this neighbor cell.

G. If the target SpCell's frequency band belongs to FR2 and Lmax=64 (where L is the maximum number of beams or SSBs which is pre-defined for various frequency ranges/bands) for target SpCell's frequency and UE has a serving cell whose frequency is same as the frequency of target SpCell, then the frame timing of target SpCell is same as the frame timing of this serving cell.

H. If the target SpCell's frequency band belongs to FR2 and Lmax=64 (where L is the maximum number of beams or SSBs which is pre-defined for various frequency ranges/bands) for target SpCell's frequency and UE has frame timing of any neighbor cell whose frequency is same as the frequency of target SpCell then the frame timing of target SpCell is same as the frame timing of this neighbor cell.

I. If the UE has obtained the frame timing of target SpCell while performing measurements of target SpCell.

Note that in an embodiment FR1 is the frequency range between 410 MHz and 7125 MHz. FR2 is the frequency range between 24250 MHz and 52600 MHz. In an alternate embodiment, FR2 may include other frequency ranges as well.

3. If the frame timing of target SpCell is available, UE does not receive and decode physical broadcast channel (PBCH) of target SpCell. It initiates the random access procedure on target SpCell at operation 130.

4. If the frame timing of target SpCell is not available, UE checks whether the frequency band of target SpCell is less than 3 GHz or not at operation 140. Note that this check may not be performed by UE which does not support frequency band>3 GHz as in this case frequency band of target SpCell will always be less than 3 GHz, So UE can skip operation 140 and perform operation 160.

5. If the frequency band of target SpCell>3 GHz, UE receives and decodes PBCH of target SpCell at operation 150. It obtains the system frame number (SFN) and half frame index from decoded PBCH to determine the frame timing.

A. PBCH block is transmitted in half frame (5 ms) and there are two half frames in one radio frame. For frequency band>3 GHz, half frame index is included in PBCH payload. Half frame index zero indicates first half frame of radio frame. Half frame index one indicates second half frame of radio frame. Based on half frame index, UE can determine the radio frame boundary. The decoded PBCH includes MIB and PBCH payload. 6 most significant bits (MSBs) of SFN are in MIB and 4 least significant bits (LSBs) of SFN are in PBCH payload. SFN obtained from decoded PBCH is the SFN of radio frame in which PBCH is received and decoded. Since SFN is sequentially assigned to each radio frame, UE can know the SFN of all radio frames.

UE then initiates the random access procedure on target SpCell at operation 151.

6. If the frequency band of target SpCell<3 GHz, UE checks if physical random access channel (PRACH) association period in target SpCell>one radio frame or if PRACH configuration period in target SpCell>one radio frame at operation 160. In an alternate embodiment, if the frequency band of target SpCell<3 GHz, UE checks if PRACH association period in target SpCell>one radio frame or if PRACH configuration period in target SpCell>one radio frame or random access response (RAR) window size in target SpCell>10 ms at operation 160. RAR window size can be the maximum RAR window size in target SpCell or configured RAR window size in target SpCell. Note that during random access procedure, UE monitors for RAR in RAR window. PRACH association period, PRACH configuration period and RAR window size are configured in random access channel (RACH) configuration of uplink (UL) bandwidth part (BWP) used for random access in target SpCell.

A. The PRACH association period starting from SFN 0 is the period in which all SSBs are mapped to PRACH occasions at least once. In an example, the association period can be equal to {1, 2, 4, 8, 16} PRACH configuration periods.

B. The number of PRACH configuration periods in association period is not signaled by gNB. It is determined by UE based on number of SSBs mapped to a PRACH occasions, number of SSBs transmitted in cell, and number of PRACH occasions in PRACH configuration period. The number of SSBs mapped to a PRACH occasion is signaled by gNB in system information (and for target SpCell in RRCReconfiguration message). The number of SSBs transmitted in cell is also signaled by gNB in system information and dedicated radio resource control (RRC) signaling message (and for target SpCell in RRCReconfiguration message). The number of PRACH occasions in PRACH configuration period is pre-defined for each PRACH config index where the PRACH config index is signaled by gNB in system information (and for target SpCell in RRCReconfiguration message). PRACH configuration period for each PRACH config index is also pre-defined. A pre-defined PRACH configuration table indicates number of PRACH occasions in PRACH configuration period, PRACH configuration period, and location of PRACH occasions in PRACH configuration period. PRACH config index is an index to an entry in this PRACH configuration table.

7. If PRACH association period in target SpCell>one radio frame, or if PRACH configuration period in target SpCell>one radio frame, or both RA association period in target SpCell and PRACH configuration period>radio frame: UE receives PBCH demodulation reference signal (DMRS) of target SpCell and obtains the half frame timing index from PBCH DMRS at operation 170. In an alternate embodiment, if PRACH association period in target SpCell>one radio frame, or if PRACH configuration period in target SpCell>one radio frame, or if RAR window size is greater than one radio frame, UE receives PBCH DMRS of target SpCell and obtains the half frame timing index from PBCH DMRS at operation 170. For frequency band<3 GHz, half frame index is included in PBCH DMRS. UE receives and decodes PBCH of target SpCell and obtains the SFN from decoded PBCH at operation 171. UE then initiates the random access procedure on target SpCell at operation 172.

A. It is to be noted that in this case SFN is needed for random access as either PRACH association period in target SpCell or PRACH configuration period in target SpCell or both is greater than one radio frame or RAR window size is greater than one radio frame. So, UE has to receive and decode PBCH of target SpCell to obtain the SFN before initiating the random access. If RAR window size is greater than one radio frame, downlink control information (DCI) scheduling RAR includes least significant bits (LSBs) of SFN in which PRACH preamble is transmitted. So UE has to receive and decode PBCH of target SpCell to obtain the SFN before initiating the random access.

8. If both PRACH association period in target SpCell and PRACH configuration period are not greater than one radio frame, UE receives PBCH DMRS of target SpCell and obtains the half frame timing index from PBCH DMRS at operation 180. In an alternate embodiment, if PRACH association period in target SpCell and PRACH configuration period and RAR window size are not greater than one radio frame, UE receives PBCH DMRS of target SpCell and obtains the half frame timing index from PBCH DMRS at operation 180. For frequency band<3 GHz, half frame index is included in PBCH DMRS. Based on half frame index, UE can determine the radio frame boundary. UE then initiates the random access procedure on target SpCell at operation 181. UE can receive and decode PBCH of target SpCell any time after initiating the random access procedure at operation 182.

A. It is to be noted that in this case SFN is not needed for random access as PRACH association period in target SpCell and PRACH configuration period are not greater than one radio frame. So, UE can receive and decode PBCH of target SpCell to obtain the SFN any time after initiating the random access.

Embodiment 2

Figure 2:
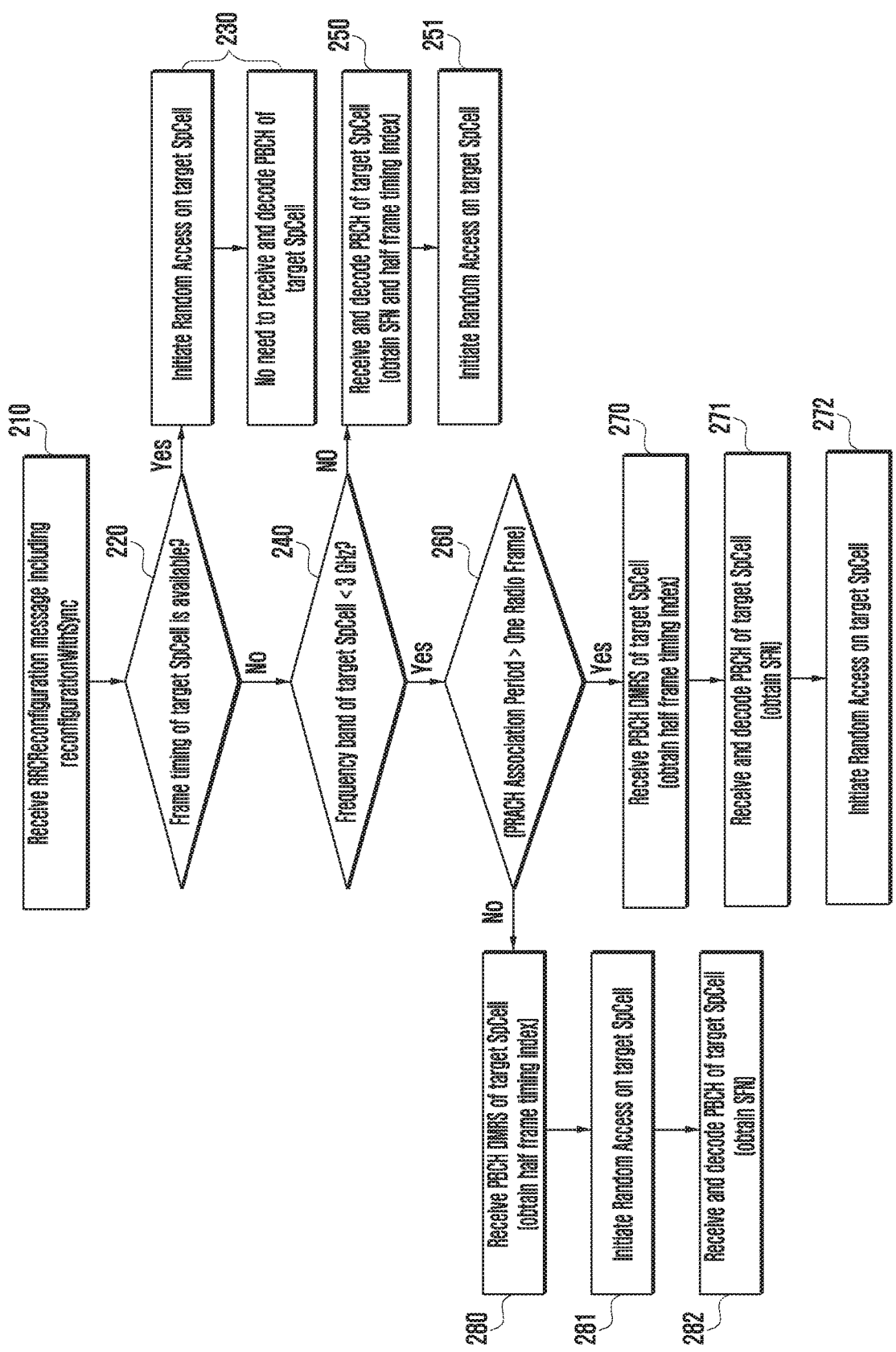
FIG. 2 shows an operation to acquire MIB upon receiving RRCReconfiguration message including reconfigurationWithSync according to an embodiment of the disclosure.

FIG. 2 shows an operation to acquire MIB upon receiving RRCReconfiguration message including reconfigurationWithSync according to an embodiment of the disclosure.

1. Referring to FIG. 2, UE receives RRCReconfiguration message wherein CellGroupConfig IE in RRCReconfiguration message contains the spCellConfig with reconfigurationWithSync at operation 210.

2. UE determines whether frame timing of target SpCell is available or not at operation 220. Frame timing is considered available if UE knows the start of radio frame and SystemFrameNumber of radio frame in target SpCell. UE can determine the frame timing of target SpCell in one of the following ways:

A. If UE has received measurement configuration in the connected state wherein the parameter deriveSSB-IndexFromCell was set to TRUE in a measurement object corresponding to 'SSB frequency (given by ARFCN) and SSB subcarrier pacing of target SpCell' and if UE is configured with a serving cell whose SSB frequency and SSB subcarrier spacing is same as SSB frequency and SSB subcarrier Spacing of target SpCell then the frame timing of target SpCell is same as the frame timing of this serving cell.

B. If UE has received measurement configuration in the connected state wherein the parameter deriveSSB-IndexFromCell was set to TRUE in a measurement object corresponding to 'SSB frequency (given by ARFCN) and SSB subcarrier spacing of target SpCell' and UE has the frame timing of any neighbor cell detected on SSB frequency of target SpCell then the frame timing of target SpCell is same as the frame timing of this neighbor cell.

C. If UE has a valid stored system information wherein the parameter deriveSSB-IndexFromCell was set to TRUE corresponding to 'SSB frequency (given by ARFCN) and SSB subcarrier spacing of target SpCell' and if UE is configured with a serving cell whose SSB frequency and SSB subcarrier spacing is same as SSB frequency and SSB subcarrier spacing of target SpCell then the frame timing of target SpCell is same as the frame timing of this serving cell.

D. If UE has a valid stored system information wherein the parameter deriveSSB-IndexFromCell was set to TRUE corresponding to 'SSB frequency (given by ARFCN) and SSB subcarrier spacing of target SpCell' and UE has the frame timing of any neighbor cell detected on SSB frequency of target SpCell then the frame timing of target SpCell is same as the frame timing of this neighbor cell.

E. If the target SpCell's frequency band belongs to FR2 and UE has a serving cell whose frequency is same as the frequency of target SpCell, then the frame timing of target SpCell is same as the frame timing of this serving cell.

F. If the target SpCell's frequency band belongs to FR2 and UE has frame timing of any neighbor cell whose frequency is same as the frequency of target SpCell then the frame timing of target SpCell is same as the frame timing of this neighbor cell.

G. If the target SpCell's frequency band belongs to FR2 and Lmax=64 (where L is the maximum number of beams or SSBs which is pre-defined for various frequency ranges/bands) for target SpCell's frequency and UE has a serving cell whose frequency is same as the frequency of target SpCell, then the frame timing of target SpCell is same as the frame timing of this serving cell.

H. If the target SpCell's frequency band belongs to FR2 and Lmax=64 (where L is the maximum number of beams or SSBs which is pre-defined for various frequency ranges/bands) for target SpCell's frequency and UE has frame timing of any neighbor cell whose frequency is same as the frequency of target SpCell then the frame timing of target SpCell is same as the frame timing of this neighbor cell.

I. If the UE has obtained the frame timing of target SpCell while performing measurements of target SpCell.

Note that in an embodiment FR1 is the frequency range between 410 MHz and 7125 MHz. FR2 is the frequency range between 24250 MHz and 52600 MHz. In an alternate embodiment, FR2 may include other frequency ranges as well.

3. If the frame timing of target SpCell is available, UE does not receive and decode PBCH of target SpCell. It initiates the random access procedure on target SpCell at operation 230.

4. If the frame timing of target SpCell is not available, UE checks whether the frequency band of target SpCell is less than 3 GHz or not at operation 240. Note that this check may not be performed by UE which does not support frequency band>3 GHz as in this case frequency band of target SpCell will always be less than 3 GHz, So UE can skip operation 240 and perform operation 260.

5. If the frequency band of target SpCell>3 GHz, UE receives and decodes PBCH of target SpCell at operation 250. It obtains the SFN and half frame index from decoded PBCH to determine the frame timing.

A. PBCH block is transmitted in half frame (5 ms) and there are two half frames in one radio frame. For frequency band>3 GHz, half frame index is included in PBCH payload. Half frame index zero indicates first half frame of radio frame. Half frame index one indicates second half frame of radio frame. Based on half frame index, UE can determine the radio frame boundary. The decoded PBCH includes MIB and PBCH payload. 6 MSBs of SFN are in MIB and 4 LSBs of SFN are in PBCH payload. SFN obtained from decoded PBCH is the SFN of radio frame in which PBCH is received and decoded. Since SFN is sequentially assigned to each radio frame, UE can know the SFN of all radio frames.

UE then initiates the random access procedure on target SpCell at operation 251.

6. If the frequency band of target SpCell<3 GHz, UE checks if PRACH association period in target SpCell>one radio frame or not at operation 260. In an alternate embodiment, if the frequency band of target SpCell<3 GHz, UE checks if PRACH association period in target SpCell>one radio frame or if RAR window size in target SpCell>10 ms at operation 260. RAR window size can be the maximum RAR window size in target SpCell or configured RAR window size in target SpCell. Note that during random access procedure, UE monitors for RAR in RAR window. PRACH association period, PRACH configuration period and RAR window size are configured in RACH configuration of UL BWP used for random access in target SpCell.

A. The PRACH association period starting from SFN 0 is the period in which all SSBs are mapped to PRACH occasions at least once. In an example, the association period can be equal to {1, 2, 4, 8, 16} PRACH configuration periods.

B. The number of PRACH configuration periods in association period is not signaled by gNB. It is determined by UE based on number of SSBs mapped to a PRACH occasions, number of SSBs transmitted in cell, and number of PRACH occasions in PRACH configuration period. The number of SSBs mapped to a PRACH occasion is signaled by gNB in system information (and for target SpCell in RRCReconfiguration message). The number of SSBs transmitted in cell is also signaled by gNB in system information and dedicated RRC signaling message (and for target SpCell in RRCReconfiguration message). The number of PRACH occasions in PRACH configuration period is pre-defined for each PRACH config index where the PRACH config index is signaled by gNB in system information (and for target SpCell in RRCReconfiguration message). PRACH configuration period for each PRACH config index is also pre-defined. A pre-defined PRACH configuration table indicates number of PRACH occasions in PRACH configuration period, PRACH configuration period, and location of PRACH occasions in PRACH configuration period. PRACH config index is an index to an entry in this PRACH configuration table.

7. If PRACH association period in target SpCell>one radio frame: UE receives PBCH DMRS of target SpCell and obtains the half frame timing index from PBCH DMRS at operation 270. In an alternate embodiment, if PRACH association period in target SpCell>one radio frame or if RAR window size is greater than 10 ms (i.e. one radio frame): UE receives PBCH DMRS of target SpCell and obtains the half frame timing index from PBCH DMRS at operation 270. For frequency band<3 GHz, half frame index is included in PBCH DMRS. UE receives and decodes PBCH of target SpCell and obtains the SFN from decoded PBCH at operation 271. UE then initiates the random access procedure on target SpCell at operation 272.

A. It is to be noted that in this case SFN is needed for random access as PRACH association period in target SpCell is greater than one radio frame. So, UE has to receive and decode PBCH of target SpCell to obtain the SFN before initiating the random access.

8. If PRACH association period in target SpCell is not greater than one radio frame, UE receives PBCH DMRS of target SpCell and obtains the half frame timing index from PBCH DMRS at operation 280. In an alternate embodiment, if PRACH association period in target SpCell is not greater than one radio frame and RAR window size is not greater than one radio frame, UE receives PBCH DMRS of target SpCell and obtains the half frame timing index from PBCH DMRS at operation 280. For frequency band<3 GHz, half frame index is included in PBCH DMRS. UE then initiates the random access procedure on target SpCell at operation 281. UE can receive and decode PBCH of target SpCell any time after initiating the random access procedure at operation 282.

A. It is to be noted that in this case SFN is not needed for random access as both PRACH association period in target SpCell and PRACH configuration period are not greater than one radio frame. So, UE can receive and decode PBCH of target SpCell to obtain the SFN any time after initiating the random access.

Embodiment 3

Figure 3:
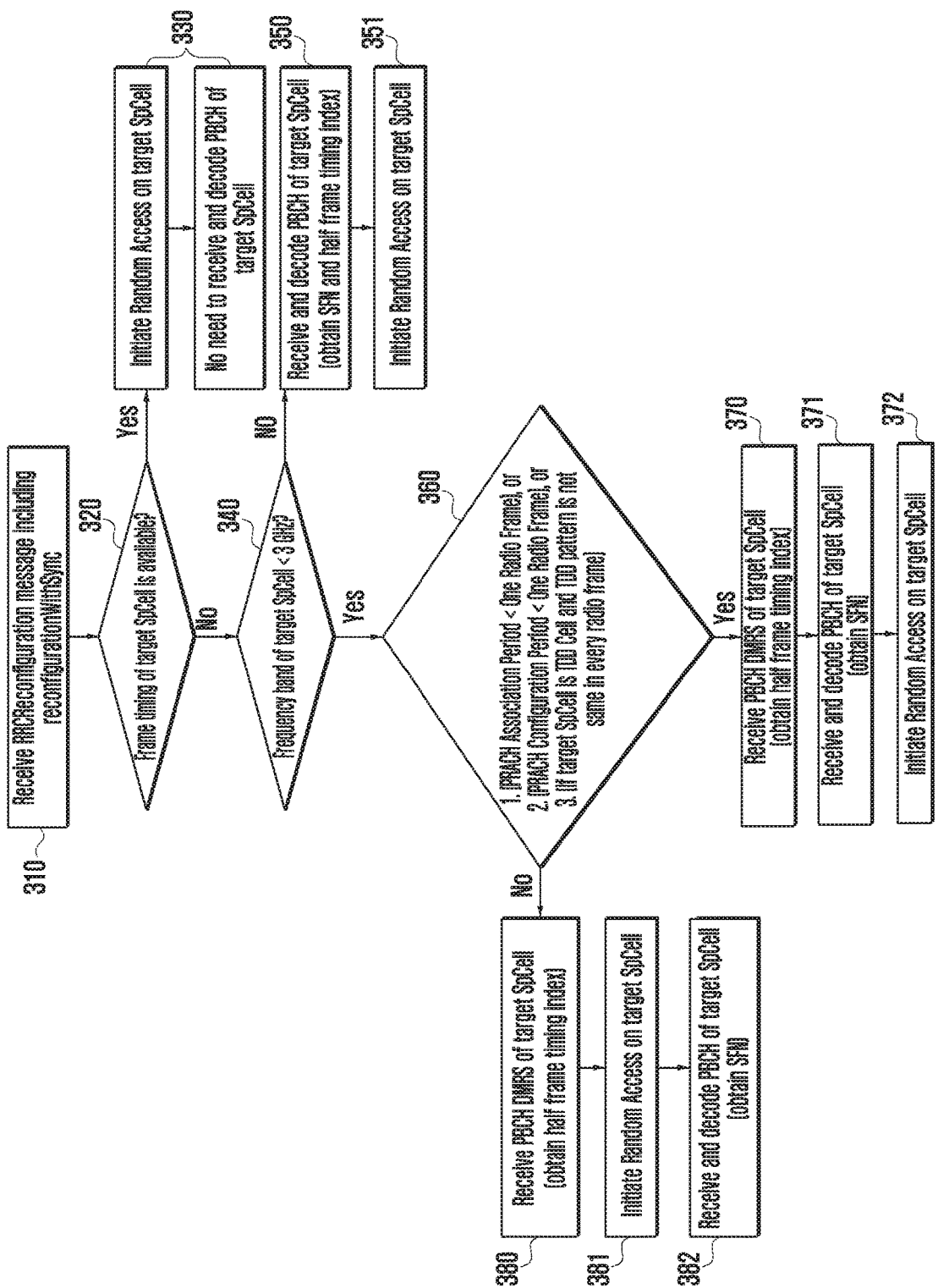
FIG. 3 shows an operation to acquire MIB upon receiving RRCReconfiguration message including reconfigurationWithSync according to an embodiment of the disclosure.

FIG. 3 shows an operation to acquire MIB upon receiving RRCReconfiguration message including reconfigurationWithSync according to an embodiment of the disclosure.

1. Referring to FIG. 3, UE receives RRCReconfiguration message wherein CellGroupConfig IE in RRCReconfiguration message contains the spCellConfig with reconfigurationWithSync at operation 310.

2. UE determines whether frame timing of target SpCell is available or not at operation 320. Frame timing is considered available if UE knows the start of radio frame and SystemFrameNumber of radio frame in target SpCell. UE can determine the frame timing of target SpCell in one of the following ways:

A. If UE has received measurement configuration in the connected state wherein the parameter deriveSSB-IndexFromCell was set to TRUE in a measurement object corresponding to 'SSB frequency (given by ARFCN) and SSB subcarrier pacing of target SpCell' and if UE is configured with a serving cell whose SSB frequency and SSB subcarrier spacing is same as SSB frequency and SSB subcarrier Spacing of target SpCell then the frame timing of target SpCell is same as the frame timing of this serving cell.

B. If UE has received measurement configuration in the connected state wherein the parameter deriveSSB-IndexFromCell was set to TRUE in a measurement object corresponding to 'SSB frequency (given by ARFCN) and SSB subcarrier spacing of target SpCell' and UE has the frame timing of any neighbor cell detected on SSB frequency of target SpCell then the frame timing of target SpCell is same as the frame timing of this neighbor cell.

C. If UE has a valid stored system information wherein the parameter deriveSSB-IndexFromCell was set to TRUE corresponding to 'SSB frequency (given by ARFCN) and SSB subcarrier spacing of target SpCell' and if UE is configured with a serving cell whose SSB frequency and SSB subcarrier spacing is same as SSB frequency and SSB subcarrier spacing of target SpCell then the frame timing of target SpCell is same as the frame timing of this serving cell.

D. If UE has a valid stored system information wherein the parameter deriveSSB-IndexFromCell was set to TRUE corresponding to 'SSB Frequency (given by ARFCN) and SSB Subcarrier Spacing of target SpCell' and UE has the frame timing of any neighbor cell detected on SSB frequency of target SpCell then the frame timing of target SpCell is same as the frame timing of this neighbor cell.

E. If the target SpCell's frequency band belongs to FR2 and UE has a serving cell whose frequency is same as the frequency of target SpCell, then the frame timing of target SpCell is same as the frame timing of this serving cell.

F. If the target SpCell's frequency band belongs to FR2 and UE has frame timing of any neighbor cell whose frequency is same as the frequency of target SpCell then the frame timing of target SpCell is same as the frame timing of this neighbor cell.

G. If the target SpCell's frequency band belongs to FR2 and Lmax=64 (where L is the maximum number of beams or SSBs which is pre-defined for various frequency ranges/bands) for target SpCell's frequency and UE has a serving cell whose frequency is same as the frequency of target SpCell, then the frame timing of target SpCell is same as the frame timing of this serving cell.

H. If the target SpCell's frequency band belongs to FR2 and Lmax=64 (where L is the maximum number of beams or SSBs which is pre-defined for various frequency ranges/bands) for target SpCell's frequency and UE has frame timing of any neighbor cell whose frequency is same as the frequency of target SpCell then the frame timing of target SpCell is same as the frame timing of this neighbor cell.

I. If the UE has obtained the frame timing of target SpCell while performing measurements of target SpCell.

Note that in an embodiment FR1 is the frequency range between 410 MHz and 7125 MHz. FR2 is the frequency range between 24250 MHz and 52600 MHz. In an alternate embodiment, FR2 may include other frequency ranges as well.

3. If the frame timing of target SpCell is available, UE does not receive and decode PBCH of target SpCell. It initiates the random access procedure on target SpCell at operation 330.

4. If the frame timing of target SpCell is not available, UE checks whether the frequency band of target SpCell is less than 3 GHz or not at operation 340. Note that this check may not be performed by UE which does not support frequency band>3 GHz as in this case frequency band of target SpCell will always be less than 3 GHz, So UE can skip operation 340 and perform operation 360.

5. If the frequency band of target SpCell>3 GHz, UE receives and decodes PBCH of target SpCell at operation 350. It obtains the SFN and half frame index from decoded PBCH to determine the frame timing.

A. PBCH block is transmitted in half frame (5 ms) and there are two half frames in one radio frame. For frequency band>3 GHz, half frame index is included in PBCH payload. Half frame index zero indicates first half frame of radio frame. Half frame index one indicates second half frame of radio frame. Based on half frame index, UE can determine the radio frame boundary. The decoded PBCH includes MIB and PBCH payload. 6 MSBs of SFN are in MIB and 4 LSBs of SFN are in PBCH payload. SFN obtained from decoded PBCH is the SFN of radio frame in which PBCH is received and decoded. Since SFN is sequentially assigned to each radio frame, UE can know the SFN of all radio frames.

UE then initiates the random access procedure on target SpCell at operation 351.

6. If the frequency band of target SpCell<3 GHz, UE checks 'if PRACH association period in target SpCell>one radio frame' or 'if PRACH configuration period in target SpCell>one radio frame' or 'if target SpCell is a time division duplex (TDD) cell and TDD pattern, i.e. TDD uplink and downlink (UL/DL) configuration in each radio frame is not same' at operation 360. In an alternate embodiment, if the frequency band of target SpCell<3 GHz, UE checks 'if PRACH association period in target SpCell>one radio frame' or 'if PRACH configuration period in target SpCell>one radio frame' or 'if target SpCell is a TDD cell and TDD pattern, i.e. TDD UL/DL configuration in each radio frame is not same' or RAR window size in target SpCell is greater than one radio frame at operation 360. RAR window size can be the maximum RAR window size in target SpCell or configured RAR window size in target SpCell. Note that during random access procedure, UE monitors for RAR in RAR window. PRACH association period, PRACH configuration period and RAR window size are configured in RACH configuration of UL BWP used for random access in target SpCell.

A. The PRACH association period starting from SFN 0 is the period in which all SSBs are mapped to PRACH occasions at least once. In an example, the association period can be equal to {1, 2, 4, 8, 16} PRACH configuration periods.

B. The number of PRACH configuration periods in association period is not signaled by gNB. It is determined by UE based on number of SSBs mapped to a PRACH occasions, number of SSBs transmitted in cell, and number of PRACH occasions in PRACH configuration period. The number of SSBs mapped to a PRACH occasion is signaled by gNB in system information (and for target SpCell in RRCReconfiguration message). The number of SSBs transmitted in cell is also signaled by gNB in system information and dedicated RRC signaling message (and for target SpCell in RRCReconfiguration message). The number of PRACH occasions in PRACH configuration period is pre-defined for each PRACH config index where the PRACH config index is signaled by gNB in system information (and for target SpCell in RRCReconfiguration message). PRACH configuration period for each PRACH config index is also pre-defined. A pre-defined PRACH configuration table indicates number of PRACH occasions in PRACH configuration period, PRACH configuration period, and location of PRACH occasions in PRACH configuration period. PRACH config index is an index to an entry in this PRACH configuration table.

C. Target cell is a TDD cell if tdd-UL-DL-Configuration-Common is included for target SpCell in RRCReconfiguration message. TDD pattern is indicated in tdd-UL-DL-ConfigurationCommon.

7. If PRACH association period in target SpCell>one radio frame, or if PRACH configuration period in target SpCell>one radio frame, or 'if target SpCell is a TDD cell and TDD pattern in each radio frame is not same': UE receives PBCH DMRS of target SpCell and obtains the half frame timing index from PBCH DMRS at operation 370. In an alternate embodiment, PRACH association period in target SpCell>one radio frame, or if PRACH configuration period in target SpCell>one radio frame, or 'if target SpCell is a TDD cell and TDD pattern in each radio frame is not same' or RAR window size in target SpCell is greater than one radio frame: UE receives PBCH DMRS of target SpCell and obtains the half frame timing index from PBCH DMRS at operation 370. For frequency band<3 GHz, half frame index is included in PBCH DMRS. UE receives and decodes PBCH of target SpCell and obtains the SFN from decoded PBCH at operation 371. UE then initiates the random access procedure on target SpCell at operation 372.

A. It is to be noted that in this case SFN is needed for random access as either PRACH association period in target SpCell or PRACH configuration period in target SpCell is greater than one radio frame or target SpCell is a TDD Cell and TDD pattern in each radio frame is not same. So, UE has to receive and decode PBCH of target SpCell to obtain the SFN before initiating the random access.

B. In case of TDD, the PRACH occasions overlapping with DL symbols are not valid in PRACH configuration period. So, if TDD pattern is not same in each radio frame, UE needs to know the SFN of target SpCell to determine the PRACH occasions in each radio frame.

8. If both PRACH association period in target SpCell and PRACH configuration period are not greater than one radio frame and if the target SpCell is a frequency division duplex (FDD) cell or TDD pattern in each radio frame is same, UE receives PBCH DMRS of target SpCell and obtains the half frame timing index from PBCH DMRS at operation 380. In an alternate embodiment, if both PRACH association period in target SpCell and PRACH configuration period are not greater than one radio frame and RAR window size of target SpCell is not greater than one radio frame and if the target SpCell is a FDD cell or TDD pattern in each radio frame is same, UE receives PBCH DMRS of target SpCell and obtains the half frame timing index from PBCH DMRS at operation 380. For frequency band<3 GHz, half frame index is included in PBCH DMRS. Based on half frame index, UE can determine the radio frame boundary. UE then initiates the random access procedure on target SpCell at operation 381. UE can receive and decode PBCH of target SpCell any time after initiating the random access procedure at operation 382.

A. It is to be noted that in this case SFN is not needed for random access as both PRACH association period in target SpCell and PRACH configuration period are not greater than one radio frame and TDD pattern in each radio frame is same'. So, UE can receive and decode PBCH of target SpCell to obtain the SFN any time after initiating the random access.

Embodiment 4

Figure 4:
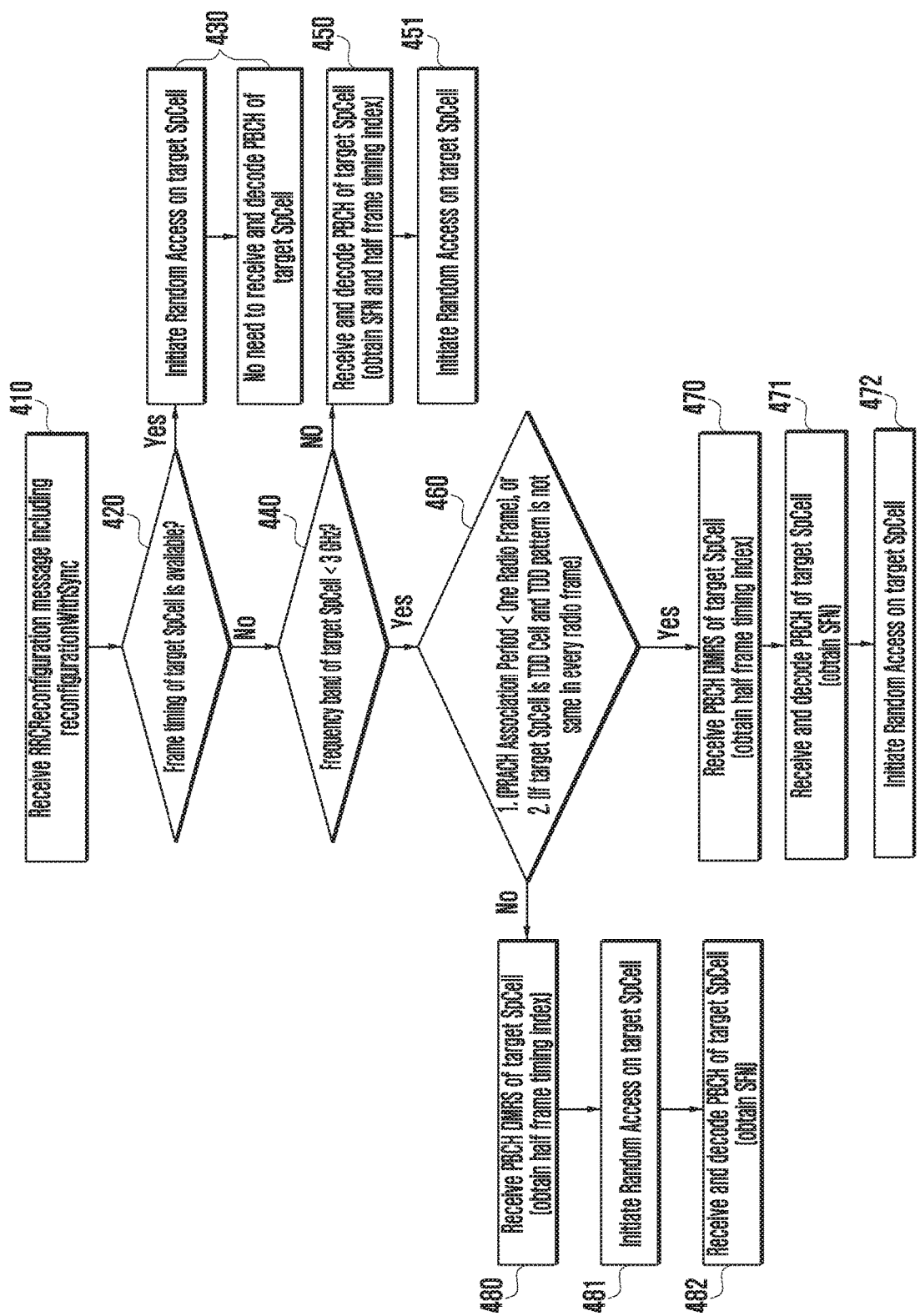
FIG. 4 shows an operation to acquire MIB upon receiving RRCReconfiguration message including reconfigurationWithSync according to an embodiment of the disclosure.

FIG. 4 shows an operation to acquire MIB upon receiving RRCReconfiguration message including reconfigurationWithSync according to an embodiment of the disclosure.

1. Referring to FIG. 4, UE receives RRCReconfiguration message wherein CellGroupConfig IE in RRCReconfiguration message contains the spCellConfig with reconfigurationWithSync at operation 410.

2. UE determines whether frame timing of target SpCell is available or not at operation 420. Frame timing is considered available if UE knows the start of radio frame and SystemFrameNumber of radio frame in target SpCell. UE can determine the frame timing of target SpCell in one of the following ways:

A. If UE has received measurement configuration in the connected state wherein the parameter deriveSSB-Index-FromCell was set to TRUE in a measurement object corresponding to 'SSB frequency (given by ARFCN) and SSB subcarrier pacing of target SpCell' and if UE is configured with a serving cell whose SSB frequency and SSB subcarrier spacing is same as SSB frequency and SSB subcarrier Spacing of target SpCell then the frame timing of target SpCell is same as the frame timing of this serving cell.

B. If UE has received measurement configuration in the connected state wherein the parameter deriveSSB-IndexFromCell was set to TRUE in a measurement object corresponding to 'SSB frequency (given by ARFCN) and SSB subcarrier spacing of target SpCell' and UE has the frame timing of any neighbor cell detected on SSB frequency of target SpCell then the frame timing of target SpCell is same as the frame timing of this neighbor cell.

C. If UE has a valid stored system information wherein the parameter deriveSSB-IndexFromCell was set to TRUE corresponding to 'SSB frequency (given by ARFCN) and SSB subcarrier spacing of target SpCell' and if UE is configured with a serving cell whose SSB frequency and SSB subcarrier spacing is same as SSB frequency and SSB subcarrier spacing of target SpCell then the frame timing of target SpCell is same as the frame timing of this serving cell.

D. If UE has a valid stored system information wherein the parameter deriveSSB-IndexFromCell was set to TRUE corresponding to 'SSB frequency (given by ARFCN) and SSB subcarrier spacing of target SpCell' and UE has the frame timing of any neighbor cell detected on SSB frequency of target SpCell then the frame timing of target SpCell is same as the frame timing of this neighbor cell.

E. If the target SpCell's frequency band belongs to FR2 and UE has a serving cell whose frequency is same as the frequency of target SpCell, then the frame timing of target SpCell is same as the frame timing of this serving cell.

F. If the target SpCell's frequency band belongs to FR2 and UE has frame timing of any neighbor cell whose frequency is same as the frequency of target SpCell then the frame timing of target SpCell is same as the frame timing of this neighbor cell.

G. If the target SpCell's frequency band belongs to FR2 and Lmax=64 (where L is the maximum number of beams or SSBs which is pre-defined for various frequency ranges/bands) for target SpCell's frequency and UE has a serving cell whose frequency is same as the frequency of target SpCell, then the frame timing of target SpCell is same as the frame timing of this serving cell.

H. If the target SpCell's frequency band belongs to FR2 and Lmax=64 (where L is the maximum number of beams or SSBs which is pre-defined for various frequency ranges/bands) for target SpCell's frequency and UE has frame timing of any neighbor cell whose frequency is same as the frequency of target SpCell then the frame timing of target SpCell is same as the frame timing of this neighbor cell.

I. If the UE has obtained the frame timing of target SpCell while performing measurements of target SpCell.

Note that in an embodiment FR1 is the frequency range between 410 MHz and 7125 MHz. FR2 is the frequency range between 24250 MHz and 52600 MHz. In an alternate embodiment, FR2 may include other frequency ranges as well.

3. If the frame timing of target SpCell is available, UE does not receive and decode PBCH of target SpCell. It initiates the random access procedure on target SpCell at operation 430.

4. If the frame timing of target SpCell is not available, UE checks whether the frequency band of target SpCell is less than 3 GHz or not at operation 440. Note that this check may not be performed by UE which does not support frequency band>3 GHz as in this case frequency band of target SpCell will always be less than 3 GHz, So UE can skip operation 440 and perform operation 460.

5. If the frequency band of target SpCell>3 GHz, UE receives and decodes PBCH of target SpCell at operation 450. It obtains the SFN and half frame index from decoded PBCH to determine the frame timing.

A. PBCH block is transmitted in half frame (5 ms) and there are two half frames in one radio frame. For frequency band>3 GHz, half frame index is included in PBCH payload. Half frame index zero indicates first half frame of radio frame. Half frame index one indicates second half frame of radio frame. Based on half frame index UE can determine the radio frame boundary. The decoded PBCH includes MIB and PBCH payload. 6 MSBs of SFN are in MIB and 4 LSBs of SFN are in PBCH payload. SFN obtained from decoded PBCH is the SFN of radio frame in which PBCH is received and decoded. Since SFN is sequentially assigned to each radio frame, UE can know the SFN of all radio frames.

UE then initiates the random access procedure on target SpCell at operation 451.

6. If the frequency band of target SpCell<3 GHz, UE checks if PRACH association period in target SpCell>one radio frame or 'if target SpCell is a TDD Cell and TDD pattern in each radio frame is not same' at operation 460. In an alternate embodiment, if the frequency band of target SpCell<3 GHz, UE checks if PRACH association period in target SpCell>one radio frame or 'if target SpCell is a TDD Cell and TDD pattern in each radio frame is not same' or RAR window size in target SpCell>one radio frame at operation 460. RAR window size can be the maximum RAR window size in target SpCell or configured RAR window size in target SpCell. Note that during random access procedure, UE monitors for RAR in RAR window. PRACH association period and RAR window size are configured in RACH configuration of UL BWP used for random access in target SpCell.

A. The PRACH association period starting from SFN 0 is the period in which all SSBs are mapped to PRACH occasions at least once. In an example, the association period can be equal to {1, 2, 4, 8, 16} PRACH configuration periods.

B. The number of PRACH configuration periods in association period is not signaled by gNB. It is determined by UE based on number of SSBs mapped to a PRACH occasions, number of SSBs transmitted in cell, and number of PRACH occasions in PRACH configuration period. The number of SSBs mapped to a PRACH occasion is signaled by gNB in system information (and for target SpCell in RRCReconfiguration message). The number of SSBs transmitted in cell is also signaled by gNB in system information and dedicated RRC signaling message (and for target SpCell in RRCReconfiguration message). The number of PRACH occasions in PRACH configuration period is pre-defined for each PRACH config index where the PRACH config index is signaled by gNB in system information (and for target SpCell in RRCReconfiguration message). PRACH configuration period for each PRACH config index is also pre-defined. A pre-defined PRACH configuration table indicates number of PRACH occasions in PRACH configuration period, PRACH configuration period, and location of PRACH occasions in PRACH configuration period. PRACH config index is an index to an entry in this PRACH configuration table.

C. Target cell is a TDD cell if tdd-UL-DL-Configuration-Common is included for target SpCell in RRCReconfiguration message. TDD pattern is indicated in tdd-UL-DL-ConfigurationCommon.

7. If PRACH association period in target SpCell>one radio frame or 'if target SpCell is a TDD cell and TDD pattern in each radio frame is not same': UE receives PBCH DMRS of target SpCell and obtains the half frame timing index from PBCH DMRS at operation 470. In an alternate embodiment, if PRACH association period in target SpCell>one radio frame or 'if target SpCell is a TDD cell and TDD pattern in each radio frame is not same' or if RAR window size in target SpCell is greater than one radio frame: UE receives PBCH DMRS of target SpCell and obtains the half frame timing index from PBCH DMRS at operation 470. For frequency band<3 GHz, half frame index is included in PBCH DMRS. UE receives and decodes PBCH of target SpCell and obtains the SFN from decoded PBCH at operation 471. UE then initiates the random access procedure on target SpCell at operation 472.

A. It is to be noted that in this case SFN is needed for random access as PRACH association period in target SpCell is greater than one radio frame. So, UE has to receive and decode PBCH of target SpCell to obtain the SFN before initiating the random access.

B. In case of TDD, the PRACH occasions overlapping with DL symbols are not valid in PRACH configuration period. So, if TDD pattern is not same in each radio frame, UE needs to know the SFN of target SpCell to determine the RACH occasions in each radio frame.

8. If PRACH association period in target SpCell is not greater than one radio frame and 'if target SpCell is an FDD Cell or TDD pattern in each radio frame is same', UE receives PBCH DMRS of target SpCell and obtains the half frame timing index from PBCH DMRS at operation 480. In an alternate embodiment, if PRACH association period in target SpCell is not greater than one radio frame and RAR window size in target SpCell is not greater than one radio frame and 'if target SpCell is a FDD Cell or TDD pattern in each radio frame is same', UE receives PBCH DMRS of target SpCell and obtains the half frame timing index from PBCH DMRS at operation 480. For frequency band<3 GHz, half frame index is included in PBCH DMRS. UE then initiates the random access procedure on target SpCell at operation 481. UE can receive and decode PBCH of target SpCell any time after initiating the random access procedure at operation 482.

A. It is to be noted that in this case SFN is not needed for random access as both PRACH association period in target SpCell and PRACH configuration period are not greater than one radio frame. So, UE can receive and decode PBCH of target SpCell to obtain the SFN any time after initiating the random access.

In the various embodiment described earlier, RAR window size.

In the various embodiment described earlier, UE determines half frame timing from DMRS of PBCH as follows:

Generic pseudo-random sequences are defined by a length-31 Gold sequence. The output sequence c(n) of length $M_{PN}$, where n=0, 1, ..., $M_{PN}-1$, is defined by $$c(n)=(x(n+N_C)+x_2(n+N_C)) \mod 2$$

$$x_1(n+31)=(x_1(n+3)+x_1(n)) \mod 2$$

$$x_2(n+31)=(x_2(n+3)+x_2(n+2)+x_2(n+1)+x_2(n)) \mod 2 \quad \text{Equation 1}$$

where $N_C=1600$ and the first m-sequence $x_1(n)$ shall be initialized with $x_1(0)=1$, $x_1(n)=0$, n=1, 2, ..., 30. The initialization of the second m-sequence, $x_2(n)$, is denoted by $c_{init}=\Sigma_{i=0}^{30} x_2(i) \cdot 2^i$ with the value depending on the application of the sequence.

The IE shall assume the DMRS sequence r(m) for an SSB is defined by $$r(m) = \frac{1}{\sqrt{2}}(1 - 2 \cdot c(2m)) + j\frac{1}{\sqrt{2}}(1 - 2 \cdot c(2m + 1)) \quad \text{Equation 2}$$

where c(n) is given earlier. The scrambling sequence generator shall be initialized at the start of each SSB occasion with $$c_{init}=2^{11}(\bar{i}_{SSB}+(\lfloor N_{ID}^{cell}/4 \rfloor+1)+2^6(\bar{i}_{SSB}+1)+(N_{ID}^{cell} \mod 4) \quad \text{Equation 3}$$

where for L=4, $\bar{i}_{SSB}=i_{SSB}+4n_{hf}$ where $n_{hf}$ is the number of the half-frame in which the PBCH is transmitted in a frame with $n_{hf}=0$ for the first half-frame in the frame and $n_{hf}=1$ for the second half-frame in the frame, and $i_{SSB}$ is the two LSBs of the SSB index.

for L=8 or L=64, $\bar{i}_{SSB}=i_{SSB}$ where $i_{SSB}$ is the three LSBs of the SSB index with L being the maximum number of SSB beams in an SSB period for a particular band.

Figure 5:
FIG. 5 is a block diagram of a terminal according to an embodiment of the disclosure.

FIG. 5 is a block diagram of a terminal according to an embodiment of the disclosure.

Referring to FIG. 5, a terminal includes a transceiver 510, a controller 520 and a memory 530. The controller 520 may refer to a circuitry, an ASIC, or at least one processor. The transceiver 510, the controller 520 and the memory 530 are configured to perform the operations of the UE illustrated in the figures, e.g. FIGS. 1 to 4, or as otherwise described above. Although the transceiver 510, the controller 520 and the memory 530 are shown as separate entities, they may be realized as a single entity like a single chip. The transceiver 510, the controller 520 and the memory 530 may also be electrically connected to or coupled with each other.

The transceiver 510 may transmit and receive signals to and from other network entities, e.g., a base station. For example, the transceiver 510 receives an RRC reconfiguration message including the spCellConfig with reconfigurationWithSync and/or tdd-UL-DL-ConfigurationCommon for the target SpCell, or a PBCH DMRS of the target SpCell.

The controller 520 may control the UE to perform functions according to one of the embodiments described above. For example, the controller 520 configured to identify at least one of whether timing of a target cell is available, whether a frequency band of the target cell is less than 3 GHz, whether a PRACH association period is greater than one radio frame, whether a PRACH configuration period is greater than one radio frame, or the target cell is a TDD cell and a TDD UL/DL pattern is not same in each radio frame of the target cell. The controller 520 is configured to determine whether to initiate a random access procedure on the target cell before receiving and decoding a PBCH of the target cell based on the identification, and to perform the random access procedure based on the determination. The controller 520 may be configured to initiate the random access procedure without receiving and decoding the PBCH if the timing of the target cell is available. The controller 520 may be configured to control the transceiver to receive a PBCH DMRS of the target cell to obtain a half frame timing index, and to initiate the random access procedure based on the half frame timing index before receiving and decoding the PBCH, if the PRACH association period and the PRACH configuration period are shorter than one radio frame, the frequency band of the target cell is less than 3

GHz, and the target cell being a FDD cell or the TDD UL/DL pattern being same in each radio frame of the target cell.

In an embodiment, the operations of the terminal may be implemented using the memory 530 storing corresponding program codes. Specifically, the terminal may be equipped with the memory 530 to store program codes implementing desired operations. To perform the desired operations, the controller 520 may read and execute the program codes stored in the memory 530 by using a processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a terminal for performing a random access procedure upon handover to a target cell in a wireless communication system, the method comprising:
   identifying whether timing of the target cell is available;
   when the timing of the target cell is not available, identifying whether a physical random access channel (PRACH) association period in the target cell is greater than one radio frame, wherein the PRACH association period is a period in which synchronization signal blocks are mapped to PRACH occasions at least once; and
   when the PRACH association period is not greater than one radio frame:
      receiving a physical broadcast channel (PBCH) demodulation reference signal (DMRS) of the target cell to obtain a half frame timing index,
      initiating a first random access procedure on the target cell based on the half frame timing index, and
      receiving and decoding a PBCH of the target cell after the first random access procedure is initiated on the target cell.

2. The method of claim 1, further comprising:
   when the timing of the target cell is available, initiating a second random access procedure without receiving and decoding the PBCH.

3. The method of claim 1, further comprising:
   identifying whether a frequency band of the target cell is less than 3 GHz.

4. The method of claim 3,
   wherein, when the frequency band of the target cell is less than 3 GHz and the PRACH association period is not greater than one radio frame,
   the first random access procedure is initiated based on the half frame timing index before the PBCH of the target cell is received and decoded.

5. The method of claim 1, further comprising:
   identifying whether a PRACH configuration period is greater than one radio frame.

6. The method of claim 5,
   wherein, when the PRACH association period and the PRACH configuration period are not greater than one radio frame,
   the first random access procedure is initiated based on the half frame timing index before the PBCH of the target cell is received and decoded.

7. The method of claim 1, further comprising:
   identifying whether the target cell is a time division duplex (TDD) cell and a TDD uplink and downlink (UL/DL) pattern is not same in each radio frame of the target cell.

8. The method of claim 7,
   wherein, when the PRACH association period is not greater than one radio frame and the TDD UL/DL pattern is the same in each radio frame of the target cell or the target cell is a frequency division duplex (FDD) cell,
   the first random access procedure is initiated based on the half frame timing index before the PBCH of the target cell is received and decoded.

9. The method of claim 1, further comprising:
   receiving a radio resource control (RRC) reconfiguration message including parameters for synchronous reconfiguration to the target cell.

10. A terminal in a wireless communication system, the terminal comprising:
    a transceiver; and
    at least one processor coupled with the transceiver and configured to:
       identify whether timing of a target cell is available,
       when the timing of the target cell is not available, identify whether a physical random access channel (PRACH) association period in a target cell is greater than one radio frame, wherein the PRACH association period is a period in which synchronization signal blocks are mapped to PRACH occasions at least once, and
       when the PRACH association period is not greater than one radio frame:
          receive, via the transceiver, a physical broadcast channel (PBCH) demodulation reference signal (DMRS) of the target cell to obtain a half frame timing index,
          initiate a first random access procedure on the target cell based on the half frame timing index, and
          receive and decode a PBCH of the target cell after the first random access procedure is initiated on the target cell.

11. The terminal of claim 10, wherein the at least one processor is further configured to,
    when the timing of the target cell is available, initiate a second random access procedure without receiving and decoding the PBCH.

12. The terminal of claim 10, wherein the at least one processor is further configured to identify whether a frequency band of the target cell is less than 3 GHz.

13. The terminal of claim 12, wherein, when the frequency band of the target cell is less than 3 GHz and the PRACH association period is not greater than one radio frame,
    the first random access procedure is initiated based on the half frame timing index before the PBCH of the target cell is received and decoded.

14. The terminal of claim 10, wherein the at least one processor is further configured to identify whether a PRACH configuration period is greater than one radio frame.

15. The terminal of claim 14, wherein, when the PRACH association period and the PRACH configuration period are not greater than one radio frame,
    the first random access procedure is initiated based on the half frame timing index before the PBCH of the target cell is received and decoded.

16. The terminal of claim 10, wherein the at least one processor is further configured to identify whether the target cell is a time division duplex (TDD) cell and a TDD uplink and downlink (UL/DL) pattern is not same in each radio frame of the target cell.

17. The terminal of claim 16, wherein, when the PRACH association period is not greater than one radio frame and the TDD UL/DL pattern is the same in each radio frame of the target cell or the target cell is a frequency division duplex (FDD) cell, the first random access procedure is initiated based on the half frame timing index before the PBCH of the target cell is received and decoded.

18. The terminal of claim 10, wherein the at least one processor is further configured to:

control the transceiver to receive a radio resource control (RRC) reconfiguration message including parameters for synchronous reconfiguration to the target cell.

\* \* \* \* \*